Patented Mar. 30, 1926.

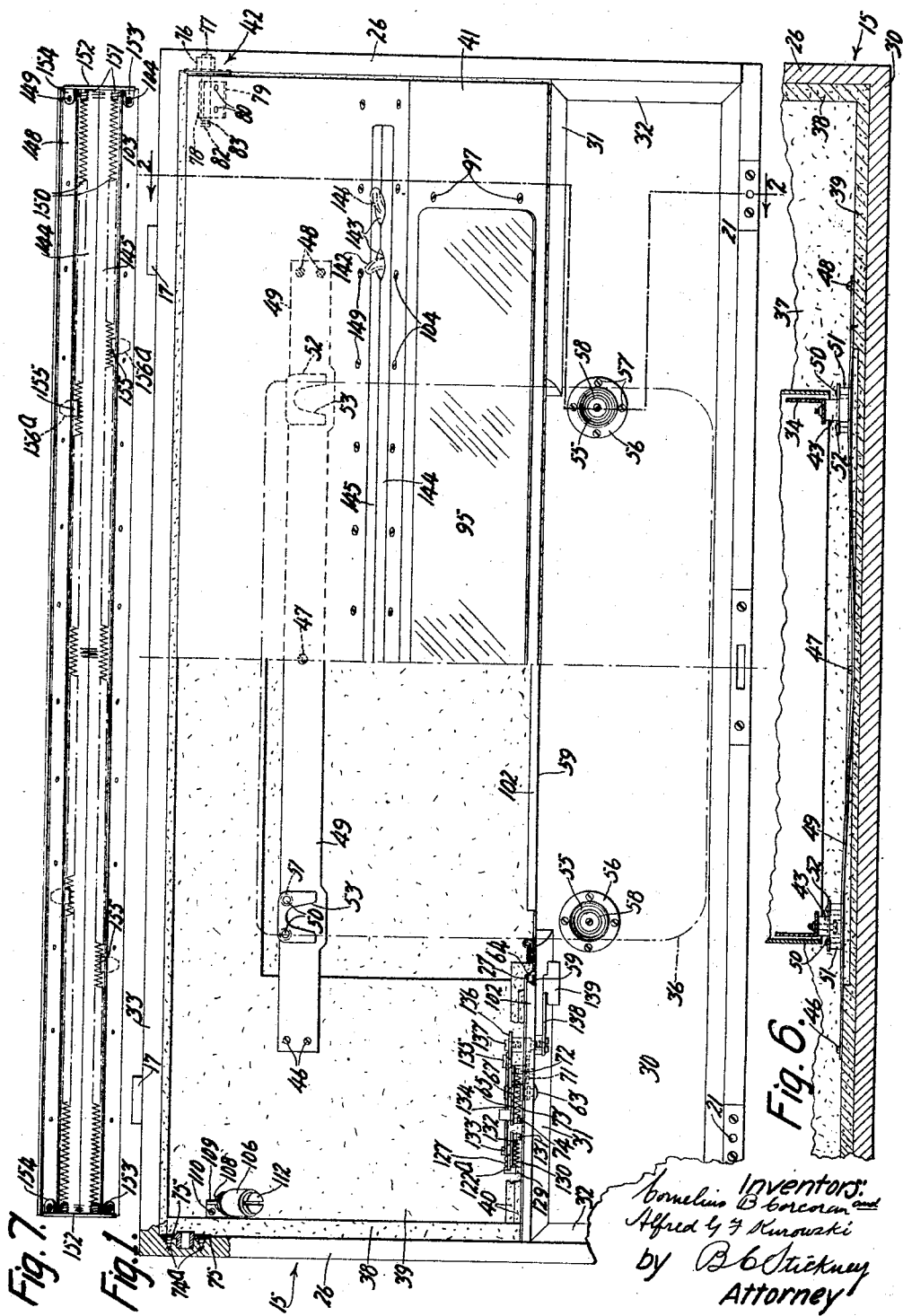

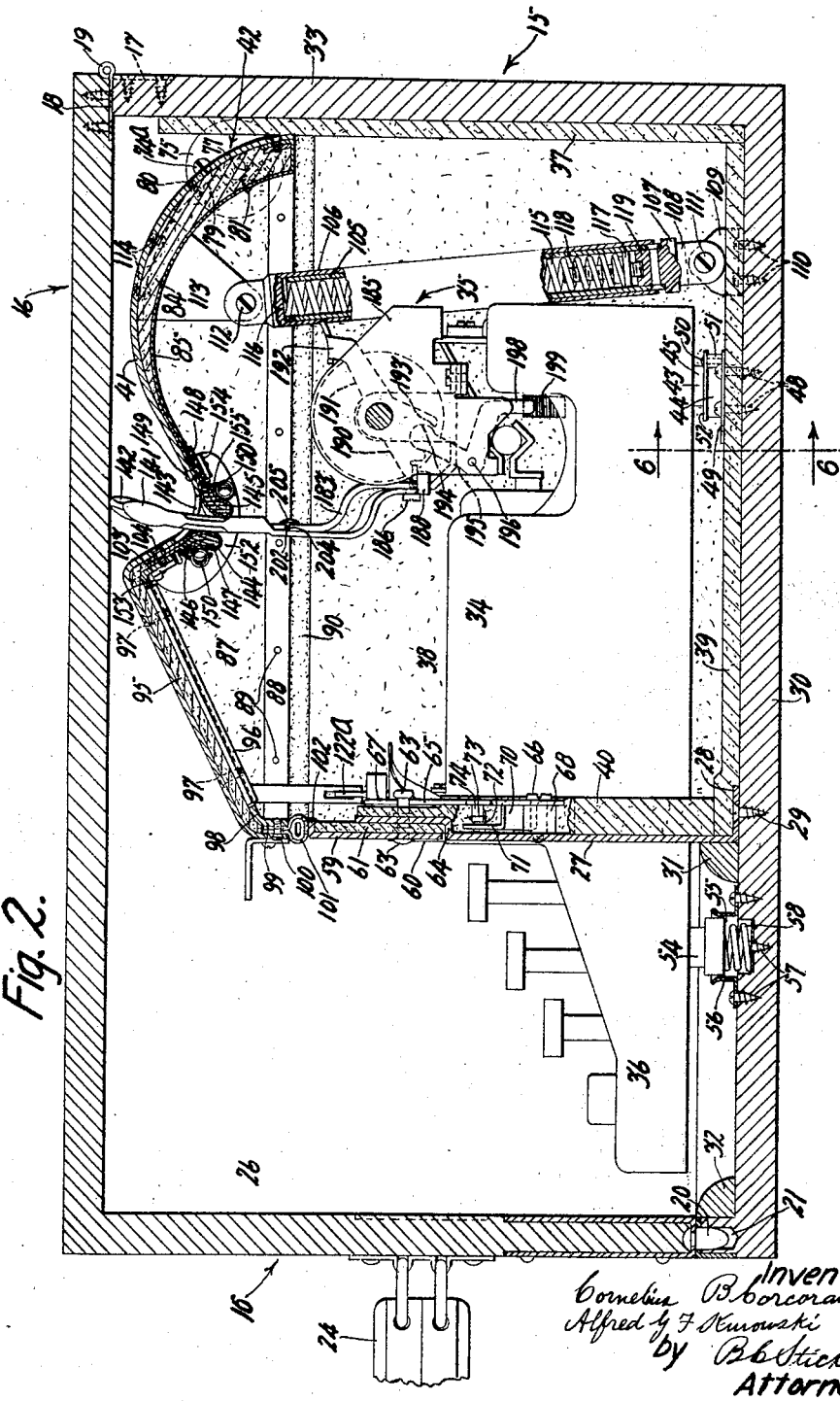

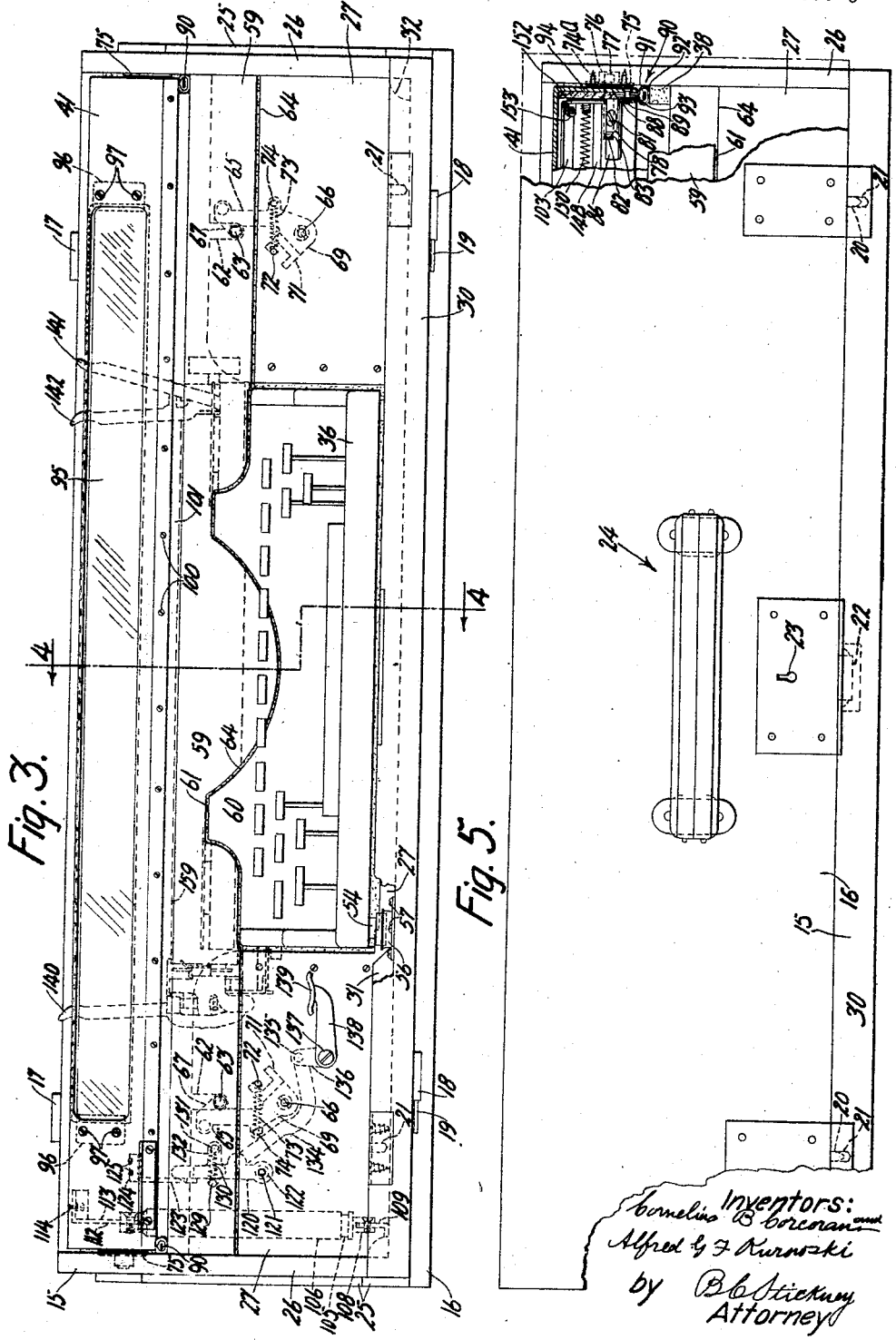

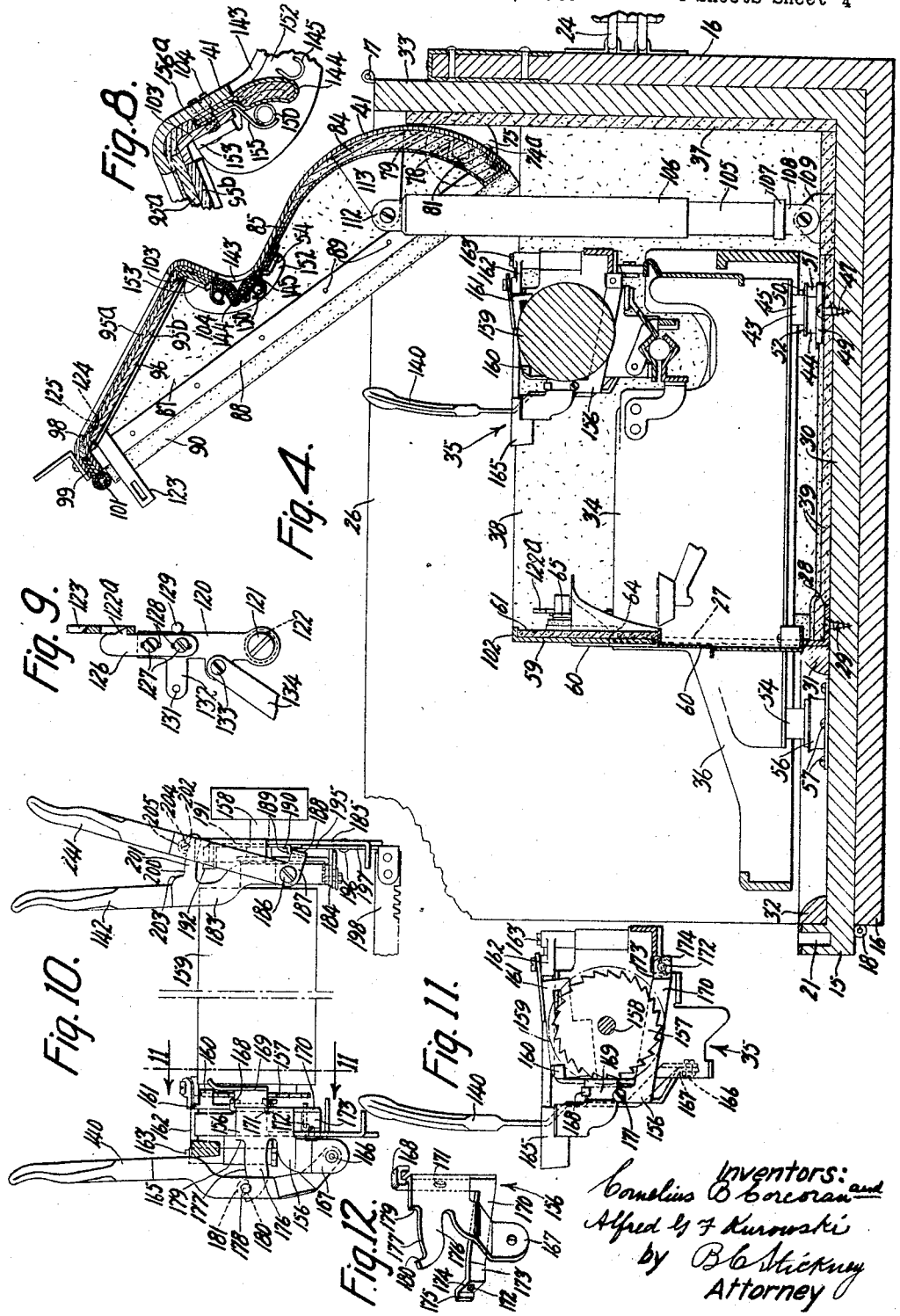

1,578,399

UNITED STATES PATENT OFFICE.

CORNELIUS B. CORCORAN, OF NEW YORK, AND ALFRED G. F. KUROWSKI, OF BROOKLYN, NEW YORK, ASSIGNORS TO UNDERWOOD TYPEWRITER COMPANY, OF NEW YORK, N. Y., A CORPORATION OF DELAWARE.

TYPEWRITING MACHINE.

Application filed December 30, 1922. Serial No. 609,793.

*To all whom it may concern:*

Be it known that we, CORNELIUS B. CORCORAN and ALFRED G. F. KUROWSKI, both citizens of the United States, said CORCORAN residing in borough of the Bronx, county of the Bronx, city and State of New York, and said KUROWSKI residing in Brooklyn Borough, county of Kings, city and State of New York, have invented certain new and useful Improvements in Typewriting Machines, of which the following is a specification.

The present invention relates to sound-deadening casings for typewriting machines. More particularly, as to certain features thereof, the invention relates to a combined carrying and sound-deadening casing; that is to say, to a casing in which a portable machine may be carried by hand from place to place, and in which the machine may be operated.

Neither sound-deadening casings nor carrying cases are new with the present invention; nor are we the first to invent a combined sound-deadening and carrying casing. The combined sound-deadening and carrying casings of the prior art, however, have been casings which have required the extension or setting up of parts preparatory to the operation of the machine therein; and which, therefore, have involved time and labor on the part of the operator in transforming the same from a carrying case to a case in which the machine is operable, and vice versa, and which have involved features adding to the cost of the same and detracting from the strength and rigidity thereof.

An object of the present invention is a casing of the general character mentioned, and which, as to the general frame-work thereof, may be fixed or permanent in its dimensions and rigid in character; necessitating no extension, unfolding or setting up of the sound-proof chamber when the machine is to be operated therein.

A feature of the invention is a combined carrying and sound-deadening casing, in which the side, rear and bottom walls of the carrying case may, without transformation, serve as the side, rear and bottom walls of an interior sound-deadening chamber. A feature of the casing is the partitioning of the interior thereof into two parts; to wit, an interior sound-deadening chamber and an outer chamber into which the keyboard extension of the machine protrudes from the sound-deadening chamber. A further feature of the casing is the construction of the same in two parts; to wit, a body portion, which contains the interior sound-deadening chamber and the exterior keyboard chamber, and a cover portion which is adapted to cover both of such chambers when the casing is to be used as a carrying case; the cover portion being removable for access to the keyboard when the machine is to be operated, and the interior sound-proof chamber being provided with a separate cover to close the rest of the machine against the emission of noise when the outer cover portion of the casing is removed.

Another feature of the invention is a novel shock-absorbing and sound-deadening support and attachment for the rear feet of the machine to the wall of the cover portion of the casing which serves as a baseboard.

Other features and advantages will hereinafter appear.

In the accompanying drawings,

Figure 1 is a top plan view of the casing; the left-hand side being shown with the cover removed, and the position of the machine being indicated in dotted lines.

Figure 2 is a view, in cross-sectional side elevation, taken on the line 2—2 of Figure 1.

Figure 3 is a front view of the casing and the machine therein; the outside casing-cover having been removed from the casing-body and the latter being seated in the removed cover.

Figure 4 is a view, in cross-section, on the line 4—4 of Figure 3; the interior sound-proof cover being, however, shown as swung up to position for access to the machine.

Figure 5 is a front view of the casing with the outer cover locked thereon for transportation; the casing being broken away at the right-hand end to show certain details within the same.

Figure 6 is a view, in cross-section, looking from the front, taken on the line 6—6 of Figure 2, and showing the means whereby the rear feet of the machine are supported upon, and secured to, the wall of the casing which serves as a base-piece for the machine.

Figure 7 is a view, looking at the interior of the cover, of the cushions which form the slot for the operating levers on the carriage, and of the means whereby the same are secured to the casing-cover.

Figure 8 is a detail view, in cross-sectional side elevation, showing the means whereby the rear of the window-pane is held to the cover, and showing the cushion which forms the front wall of the slot for the levers on the carriage and the attachments of the same to the cover.

Figure 9 is a rear view of the device for locking down the interior sound-proof cover.

Figure 10 is a front view of the platen and platen-carriage, with the line-space lever and line-space mechanism at the left-hand end thereof, and with the rack-release lever and carriage-return arm at the right-hand end thereof.

Figure 11 is a view, in side elevation, taken on the line 11—11 of Figure 10.

Figure 12 is a detail perspective view of the bracket which supports the line-space lever.

The casing comprises a body-portion 15 and an outside cover-portion 16. The parts 15 and 16 have hinge-plates 17 and 18, respectively, secured thereto; and the plates 17 have fixed thereto hinge-pins 19 for receiving the plates 18. In the lower edges of the front wall of the cover-part 16 (see Figure 2) are pins 20, adapted, when the cover is in closed position on the body-portion 15, to be received in pockets or recesses 21 in the forward edge of the part 15. A lock 22, of any suitable character, operable by a key adapted to be set into the key-hole 23 in the front wall of the cover 16, serves to secure the cover 16 to the body-part 15. The assembled casing with the machine therein may be carried by means of a handle 24 on the cover 16. When so carried by the handle 24, the pins 20 serve to support the body-part 15, and machine, from the cover. When the lock 22 is released and the cover 16 swung around the hinges 19 sufficiently to clear the pins 20 of the recesses 21, the cover-part may be shifted longitudinally leftward to clear the hinge-plates 18 thereon from the hinge-pins 19; whereupon the cover-part 16 may be lifted from the body-part 15, and, if desired, placed in the position shown in Figure 4, wherein the body-part 15, with the machine thereon, is shown as seated in the inverted cover. Preferably the cover has side flanges 25 (see Figure 3), which are adapted to fit over the side walls 26 of the body-part in both the Figure 2 and Figure 4 positions.

The body-portion 15 of the casing is divided longitudinally by a plate 27, which extends from one to the other of the side walls 26 thereof. The plate 27 is offset at its lower edge to form a flange 28, through which are passed wood screws 29, securing the plate to the base 30 of the body-part of the casing. The plate 27 may be further braced by means of a strip 31 extending longitudinally thereof on the base 30. A similar strip 32 may be extended from side to side of the body-part, at the forward edge thereof, where the cover engages the base. The plate 27, together with the rear wall 33 of the part 15, and the side walls of the latter, forms an interior chamber adapted to receive the main frame 34 and the carriage 35 of the machine. The keyboard-extension 36 of the machine protrudes through, and forward of, the plate 27, so that the keyboard may be accessible when the outer cover 16 is removed. This interior chamber has the rear wall thereof lined with sound-deadening material 37; the side walls thereof with sound-deadening material 38; the base thereof with sound-deadening material 39; and the front thereof with sound-deadening material 40, which latter is suitably secured to the plate 27. The interior chamber is also provided with a cover 41, hinged at 42 to the casing side walls 26, and adapted to be swung from its normal, Figure 2, position, to the position shown in Figure 4, in which latter position access may be had to the machine, for erasures and the like.

The machine is centered upon, and held to, the casing-wall 30 in the position shown in Figures 1, 2 and 4. For securing and centering the rear feet 43 of the machine, the latter have heads or shoulders 44, offset from reduced portions 45. Secured by screws 46, 47 and 48 to the base 30 is a spring-metal strip 49. This strip is bent or sprung between the screws 47 and 48 on the one hand, and the screws 46 and 47 on the other hand, as shown in Figure 6, to provide a resilient or cushion-support for the rear feet 43 of the machine. Secured to, but spaced up from, the strip 49, by means of screws 50 and spacing-blocks 51, are brackets 52, one for registration with each of the rear feet. These brackets have openings 53 therein of such width as to permit the heads 44 of the rear feet to be passed therethrough to the plate 49. The spacing of the brackets 52 from the plate 49 is such that, when the heads of the rear feet are thus placed upon the plate 49, the machine may be pushed rearward to cause the heads of the feet to pass under the brackets, while the narrower parts 45 of the feet are received in the more constricted rearward parts of the openings 53. The rear walls of the openings 53 by engagement with the parts 45 of the rear feet determine the rearward movement of the machine to home position; and, when the machine is in this position, the brackets 52 overlie the heads 44 of the feet in such manner as to prevent lifting of the rear portion of the machine. When, in this position, the front feet 54 of the machine register with pockets 55 in disks 56, secured by screws 57 to the base 30. These pockets are of a size to receive the front feet 54; and within the pockets are coil-springs 58, which serve to cushion the front of the machine on the base. When the feet 54 are in the pockets 55, forward movement of the machine is prevented. The front of the machine is then locked against upward movement by a plate 59, secured to the upper edge of the plate 27, and which crosses over, and fits down upon, the front plate 60 of the machine, as shown in Figure 3. This plate 59 is provided with a sound-deadening lining 61 and forms an upward continuation of the front wall of the interior chamber to the lower front edge of the interior cover 41 when the latter is in normal, Figure 2, position.

In order that the plate 59 may be readily removed for the insertion of the machine, and thereafter locked in place upon the plate 27, the following means are provided. In the upper edge of the plate 27, one at each side thereof, are two vertical slots 62. Fast to the plate 59, and adapted to register with the slots 62, are pins 63 which project inward from the plate 59 through the lining of the latter, and through slots in the lining 40 of the plate 27, to a point beyond the interior face of the latter lining. When the pins 63 are registered with the slots 62, the plate 59 may therefore be lowered into Figure 3 position for engagement with a shoulder 64 on the plate 27, and for engagement with the front wall 60 of the machine. In this position, hooks 65, pivoted at 66 to the plate 27, are adapted to have their noses 67 snapped over the pins 63, to lock the plate 59 down against upward displacement. As shown in Figure 2, the hooks 65 are spaced from the plate 27, by means of collars 68 on the pivot-pins 66. Each hook 65 has a finger 69 integral therewith, which finger, as shown in Figure 2, is offset forward at 70, and then upward in the form of a yoke 71. The yoke 71 loosely embraces a stop-pin 72, fast to the plate 27; and the throw of the hook, in either direction, is determined by the engagement of one or the other of the arms of the yoke with the pin 72. The pin 72 also serves as anchorage for one end of a spring 73, the other end of which is secured by a pin 74 to the hook. The tension of the spring is such as to urge the hook in a direction to lock, and hold locked, the plate 59 upon the plate 27. The lining 40 on the plate 27 is suitably cut away or recessed, to receive the finger 69 of the hook, and to allow for movement of the latter with the hook.

The cover is pivotally connected to the casing side walls 26 in the following manner. Secured, by means of wood screws 74$^a$, to the walls 26 are disks or plates 75, having bushings 76 integral therewith and offset into countersinks in the walls 26. These bushings serve as journals for pivot-pins 77. The pins 77 are held to the cover-wall 41 by U-shaped members or yokes 78, each of which has a flange 79 to receive screws 80, for holding the U-pieces to the cover. The pivot-pins 77 are held against longitudinal movement in the U-pieces, and in the bushings 76, by set-screws 81 in the U-pieces. The pivot-pins (see Figure 5) project at 82 beyond the ends of the U-pieces; and such projecting ends have grooves 83, to receive the finger-nail, or another implement, for sliding the pins in and out of the bushings 76 when the set-screws 81 are loosened; thus permitting the cover 41 to be mounted in the casing, or to be removed expeditiously, and at will. The cover, like the rest of the interior casing, is provided with a lining 84; and this lining is provided with a facing-piece 85, of sheet-metal or other material, to prevent fouling of the paper, in the machine, on the lining 84 as the carriage is moved in letter-feed and return directions. As indicated in Figure 2, the lining 84 is recessed to receive the U-pieces 78 and pivot-pins; and, to permit of access to the pivot-pins and to the set-screws, the facing-piece 85, as shown in Figure 5, is cut away at 86.

As hereinbefore stated, the normal position of the cover 41 is that shown in Figure 2. The lower edges of the side lining-members 87 of the cover are held by strips 88; and screws 89 pass through the cover and through the lining 87 and thread into the strips 88. Also held by the strips 88 and screws 89 (see Figure 5) are side cushions 90, by means of which the cover, at the sides thereof, is supported on the upper edges of the side lining-members 38 of the casing-part 15. These cushions consist of lengths of rubber tubing 91, wrapped in strips 92, of flexible material, such as felt, the edges of which strips are brought together at 93 between the side walls 94 of the cover and the retaining strips 88, heretofore mentioned. The screws 89 pass through the gathered ends of the felt 92.

In the front of the cover is a window, through which the writing on the platen may be observed. A window-pane 95, of glass or other transparent material, is set into a frame provided therefor in the cover. In the drawings, the pane is shown as comprising superposed sheets of glass 95$^a$, 95$^b$ (see Figure 8). At the sides of the window are metal plates 96, secured to the cover by screws 97, which plates, at the edges thereof, underlie the edges of the lower pane 95^b, and serve as shelves on which the windowpanes are supported from the cover. At the front of the window, the forward edge of the pane 95^a is supported by a flange 98 on a metal strip 99, secured by screws 100 to the lower front edge of the cover. The strip 99 and screws 100 serve also to hold to the cover a cushion 101, similar in all respects to the side cover-supporting cushions 90, and which rests upon an offset 102 on the upper edge of the removable front plate 59, when the cover is in normal position. At the rear of the window, a metal strip 103 serves as a supporting shelf for the rear edge of the pane 95^a, and this strip 103 is held to the cover-plate 41 by screws 104.

The cover is normally locked down in Figure 2 position. When, however, the cover is unlocked, it is adapted to be automatically thrown open, that is, to Figure 4 position, by a spring-device. This device comprises two telescoping cylinders 105, 106. The cylinder 105 terminates at its lower end in a head 107, carrying a yoke 108, in which is received a bracket-plate 109, secured by wood screws 110 to the base 30. A pivot-pin 111 connects the yoke 108 to the bracket-plate 109, so that the cylinder 105 may swing backward and forward. The cylinder 106 is similarly constructed and pivotally connected at 112 to a bracket-plate 113, secured by screws 114 to the cover-plate 41. Within the telescoping cylinders is a coil-spring 115, which bears at its upper end against a head 116 of the outer cylinder 106, and which, at its lower end, bears against a collar 117, which is adjustable within the inner cylinder 105. For effecting adjustment of the position of the collar 117, to vary the tension of the spring 115, a screw 118 is threaded through the collar 117, and bears upon a fixed head 119 in the inner cylinder. By turning the screw 118, the position of the collar 117, with respect to the head 119, may be changed at will. The tension of the spring 115 is such as to throw the cover open as soon as the same is unlocked.

The cover is held against opening by a lock (see Figures 3 and 9) at the front wall of the interior casing. This lock consists of a hook 120, pivoted at 121 to the plate 27, and held suitably spaced therefrom by a collar 122 on the pivot-pin 121. The nose 122^a of the hook is adapted to be engaged in a stirrup 123, depending from the cover-plate 41, at the left-hand side of the window, and having a flange 124 at its upper end to receive a screw 125, by means of which the stirrup is held to the cover. The nose 122^a of the hook is carried by a piece 126, adjustable up and down, with respect to the hook-proper 120, for accurate determination of the correct locked position of the cover and casing-proper. To permit of such adjustment, headed screws 127 on the hook-proper pass through slots 128 in the adjustable part 126. The locked position of the hook is determined by a stop-pin 129 on the plate 27. This pin also serves as anchorage for one end of a spring 130 (see Figure 3), the other end of which spring is connected to a pin 131 on a finger 132 of the hook-proper. The spring 130 acts automatically to throw the hook to cover-locking position, and to hold the same in such position. For moving the hook to unlock the cover, there is pivotally connected thereto, at 133, a link 134, the other end of which link is pivotally connected at 135 to an arm 136, fast on a rock-shaft 137, journaled in the front plate 27. The shaft 137 passes through the front plate, and, on the outside of the front plate, has fast thereto an arm 138, carrying a finger-piece 139. Depression of the finger-piece 139 causes the arm 138 to be rocked in such manner as to draw on the link 134, and release the hook; whereupon the spring-device, heretofore mentioned, throws open the cover.

Since the machine is to be operated in the sound-proof inner casing, and since the side walls 26 of the casing-part 15 form also the side walls of the interior sound-proof chamber, the length of the several parts of the casing must be such as to allow for full movement of the carriage in letter-feed and return directions on the machine. Secured to the carriage, however, are various operating levers and arms which should be accessible from the outside of the sound-proof chamber. These levers and arms comprise a line-space lever 140, a carriage-rack-release-lever 141 and a carriage-return-arm 142. If they are to project to the outside of the sound-proof chamber, the latter must be slotted to permit them to travel therealong with the carriage. Such a slot is shown at 143 in the cover at the rear of the window-pane. If this slot is open, however, undesirable noise will be emitted therethrough. Consequently, resilient cushions are provided which come together to close the slot, except at the points where the levers and arms protrude therethrough. These cushions (see Figures 2 and 8) are a forward cushion 144 and a rearward cushion 145. The cushions are identical in construction, consisting of an inner flattened tube 146, of flexible material, embraced and supported by a strip 147, of flexible material, such as felt, the ends of which are brought together and secured to the cover-plate. As to the forward cushion, the felt edges are brought between the rear window-pane-supporting strip 103 and cover-plate 41. The screws 104, which hold the strip 103, pass through and hold the edges of the felt 147. The edges of the felt 147 of the rear cushion are similarly brought together between the cover-plate 41 and a metal strip 148, which is held to the cover-plate by screws 149, which pass through the gathered edges of the felt and thread into the strip 148. Each cushion also comprises a coil-spring 150, which extends longitudinally the full length thereof, and the ends of which are set on pins 151 in bracket-plates 152. Each plate 152, at the forward end thereof, is provided with an ear 153, by means of which it is secured to the window-retaining strip 103, and, at its rear end, with an ear 154, by means of which it is secured to the retaining strip 148. The coils 150, as shown in Figure 2, are set against the flexible cushion-parts 146 in such position as to yieldingly hold the latter together, to close the slot between the same. In addition to their end supports on the plates 152, the coils are held to the cushion parts 146 at intervals throughout their length by spring clips 155 (see Figure 8). These clips are curved to embrace the coils, and have flattened tongues 156ª, adapted to be inserted between the retaining strips 103 and 148, as the case may be, and the gathered ends of the cushion-holding felt between such strips and the cover-wall 41. In forcing the clips into position, the felt is compressed, and being thereafter under compression, exerts a frictional hold on the clips which prevents their accidental displacement. The clips may, therefore, be positioned and removed without manipulation of any special attaching means therefor; and, being held, as above stated, may be positioned wherever desired along the cushions, and in any desired number. Preferably the clips for holding the coil of the rear cushion are staggered with respect to the clips for holding the coil of the front cushion. This is so, in order that two opposed and immediately-registering clips, one bearing on each cushion, may not offer too great a resistance to movement of the levers with the carriage along the cushions. As has been stated, the clips themselves are flexible, and, if made sufficiently flexible, might even be directly opposed to each other on the two cushions.

Except for the lever 140 and a bracket 156, on which the same is mounted, the line-space mechanism shown in the drawings is that found in the Underwood standard portable typewriter. It consists of a ratchet-wheel 157, fast on the shaft 158 of the platen 159. A pawl 160, for actuating the ratchet-wheel, is mounted on a slide 161, connected to one arm 162 of a bell-crank-lever, pivoted at 163 on the carriage-frame. The other arm 164 of the bell-crank-lever projects forward and terminates in a finger-piece 165 within the interior sound-proof chamber. This finger-piece is adapted to be engaged and operated by the lever 140, which projects through the slot 143 to the outside of the cover. The lever 140 is pivoted at 166 to an ear 167, forming part of the bracket 156. The bracket 156 has formed thereon, at the right-hand end thereof (see Figures 10 and 12), an ear or prong 168, bent over, in the form of a hook, to engage the upper edge of the side piece 169 of the carriage-frame at the forward part of the same, and to support the bracket 156 upon the carriage-frame at this point. The bracket 156 also has a side piece or plate 170, which extends (see Figure 11) from the front of the platen, alongside the side plate 169 of the carriage, under the platen-axle, to the rear of the latter. Near the forward part of the bracket-extension 170, substantially directly below the hook 168, a headed screw 171 is threaded into the bracket-extension 170, near the under edge of the carriage side piece 169, in such position that, when the screw is tightened, the head thereof will overlap and bear against the carriage side piece 169, thereby assisting the hook 168 in holding the bracket to the carriage. Similarly, at the rear of the bracket-extension 170, another headed screw 172 is threaded into the same, alongside the lower rear edge of the carriage side piece, and in such position that, when the screw 172 is tightened, the head thereof will overlie, and bear against, the side plate of the carriage, thereby furnishing an additional anchor for the bracket 156 at the rear of the platen. The screw 171 is turned into the bracket from the right-hand side thereof, whereas the screw 172 is turned into the bracket from the left-hand side thereof; the bracket being thus engaged from both sides of the carriage side plate. To permit the head of the screw 172 to engage the carriage side plate at the left-hand side thereof, the bracket-extension 170 (see Figure 12) is offset leftward, at 173, to bring it, at 174, to the plane of the outer or left-hand portion of the carriage side plate. The portion 174 of the bracket-extension 170 may have a further leftward lip or offset 175, the end of which is flush with the outer surface of the bracket side plate, so that the head of the screw 172, by engagement therewith, and with the outer face of the bracket side plate, may automatically and correctly position the bracket-extension 170 with respect to the carriage side plate. It will be noted from the foregoing that, although the bracket 156 is securely anchored at three points, and in different planes to the carriage side plate, there are no special attachments on the latter for the bracket, nor are there any screw-holes required in the carriage side plate for attachment of the bracket.

That reach of the bracket, to which the lever 140 is pivoted, extends lengthwise of the platen-axle, at right angles to the rearward bracket-extension 170, and thence downward with a rearward offset to the pivot-point 166 of the lever 140. The bracket 156 has another prong or extension 176, at the front thereof, lengthwise of the platen-axle. The upper edge of the bracket-extension 176 is cut away at 177, on a curve struck from the pivot-point 166; and the lever 140 carries a pin 178, adapted to travel along the curved edge of the recess 177, and to engage shoulders 179 and 180, respectively, at the right and left hand ends of the recess 177, to determine the throw of the lever 140 in either direction. To steady the lever 140 on its pivot 166, against forward and rearward angular movement, the pin 178 is provided with a head 181, to engage with the rear face of the bracket-extension 176.

The carriage-return arm 142 is a fixed arm at the front, and at the right-hand end of the platen, which forms a continuation of a bracket 183, which is extended under the platen-axle, to the rear thereof, and made fast to an ear 184 on the right-hand carriage side plate 185. The carriage-rack-release-lever 141 is a bell-crank-lever pivoted at 186 to the carriage-return arm. One arm 187 of this bell-crank-lever (see Figure 10) projects rightward, and terminates in a rearwardly-offset lip 188, which underlies, and is adapted to engage, a lip or detent 189, offset leftward (see Figures 2 and 10) from the rack-release-lever 190, commonly found in the Underwood standard portable typewriter. The lever 190 is a lever pivoted on the platen-axle, and having a rearward extension 191, carrying a finger-piece 192, by depression of which the carriage-rack has heretofore been released. The lever 190 has a yoke 193, in which is fitted the end 194 of an arm 195, forming part of a bell-crank-lever pivoted at 196 to the right-hand carriage side plate. The other arm 197 of this bell-crank-lever supports the right-hand end of the carriage-rack 198. The left-hand end of the carriage-rack 198 is supported by an arm (not shown), but similar to the arm 197 pivoted at the right-hand side of the carriage. In the normal position of the parts shown in Figure 2, the rack 198 meshes with a drive-pinion 199. The escapement mechanism and spring-drum, by means of which the rack 198 is driven from the pinion 199, are not shown, but may be such as are found in the Underwood machine. When the bell-crank-lever 195—197 is rocked counterclockwise, by the lever 190, the rack is lifted out of engagement with the pinion 199, to permit the free movement of the carriage. As just described, leftward throw of the rack-release-lever 141 moves the lever 190 in such manner as to release the rack.

The carriage-return arm 142 has a rightward projecting prong or extension 200, the upper surface 201 of which is shaped on an arc struck from the pivot 186 as a center; and the lever 141 carries a pin 202 adapted to ride on the edge 201, and, by abutment with shoulders 203 and 204, respectively, at the left and right hand ends of the curve 201, to determine the throw of the lever 141 in either direction. Throw of the lever 141 to the left first releases the rack; and continued leftward pressure on the lever 141, after the pin 202 has struck the shoulder 203, will result in leftward movement of the carriage. To steady the lever 141 against forward and rearward movement on its pivot 186, the pin 202 is provided with a head 205 for engagement with the rear face of the prong 200 on the carriage-return arm.

Variations may be resorted to within the scope of the invention, and portions of the improvements may be used without others.

Having thus described our invention, we claim:

1. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved.

2. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; the cover-portion comprising the top and front walls of the casing.

3. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; the cover-portion being removable from the body-portion.

4. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; the cover-portion being hinged and connected to the casing-body in such manner that, when swung clear of the casing base-wall, it may be released entirely from the body-portion.

5. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; and hinge pins so connecting the cover-portion to the body-portion that movement of the cover-portion longitudinally of the casing-body releases the cover-portion from the body-portion.

6. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; and pins on one of the casing-portions adapted to be received in recesses in the other casing-portion for supporting the casing-body, and enclosed machine, from the cover-portion.

7. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; the cover-portion being removable from the body-portion, and having side flanges adapted to fit over the side walls of the casing-body when the cover is closed on the body, and when the body is set upon the removed and inverted cover.

8. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; and the side walls of the casing-body comprising sound-deadening material and serving as the side walls of the interior chamber.

9. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; and the rear wall of the casing-body comprising sound-deadening material and serving as the rear wall of the interior chamber.

10. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; and the side and rear walls of the casing-body comprising sound-deadening material and serving as the side and rear walls of the interior chamber.

11. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; and another cover for the interior chamber for maintaining the interior chamber closed when the outer cover-portion of the casing is moved for access to the keyboard.

12. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; and another cover for the interior chamber for maintaining the interior chamber closed when the outer cover-portion of the casing is moved for access to the keyboard; the interior cover being movable for placement and removal of, and for access to, the machine.

13. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening therein through which the keyboard extension of the machine may protrude for accessibility to the operator when the cover-portion of the casing has been moved; and another cover for the interior chamber for maintaining the interior chamber closed when the outer cover-portion of the casing is moved for access to the keyboard; the interior cover being hinged to the side walls of said body-portion of the casing.

14. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening into which the keyboard extension of the machine may be lowered, and through which the keyboard extension of the machine may protrude for accessibility to the operator when the cover-portion of the casing has been moved, and a plate attachable to the partition over the keyboard extension of the machine, after the machine is in place, to form a portion of the front wall of the interior chamber.

15. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening into which the keyboard extension of the machine may be lowered, and through which the keyboard extension of the machine may protrude for accessibility to the operator when the cover-portion of the casing has been moved, a plate attachable to the partition over the keyboard extension of the machine, after the machine is in place, to form a portion of the front wall of the interior chamber, and attaching means for said plate comprising pins on the plate adapted to be set into slots in the partition, and hooks on the partition adapted to be swung over the pins.

16. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening into which the keyboard extension of the machine may be lowered, and through which the keyboard extension of the machine may protrude for accessibility to the operator when the cover-portion of the casing has been moved, and a plate extending from one to the other of the side walls of the casing-body and attachable to the partition over the keyboard extension of the machine, after the machine is in place, to form an upward continuation of the front wall of the interior chamber.

17. A casing, for a typewriting machine, of a fixed length sufficient for movement therein of the carriage on the main frame of the machine in the operation of the latter, and of a width sufficient to receive the keyboard extension as well as the rest of the machine; the casing having body and cover portions, and the body-portion having a longitudinal partition therein which forms the front wall of an interior sound-deadening chamber for the main frame and carriage of the machine; such partition having an opening into which the keyboard extension of the machine may be lowered, and through which the keyboard extension of the machine may protrude for accessibility to the operator when the cover-portion of the casing has been moved, a plate extending from one to the other of the side walls of the casing-body and attachable to the partition over the keyboard extension of the machine, after the machine is in place, to form an upward continuation of the front wall of the interior chamber, and a movable cover for the interior chamber, adapted to rest upon said plate, for closing the interior chamber when the outer cover-portion of the casing is removed for access to the keyboard.

18. A sound-deadening casing for a typewriting machine having a slot therein through which may protrude and along which may travel an operating arm on the carriage of the machine, cushions, one on each edge of the slot, each comprising a strip of flexible material, a strap of sheet-material secured to the casing for holding, between the same and the casing, the edge of the flexible cushion strip, a coil spring set against the rear of each flexible strip for yieldingly holding the opposed strips together to close the slot, a bracket at each end of the slot attached to the sheet-material straps, and means on the brackets for holding the coil springs.

19. A sound-deadening casing for a typewriting machine comprising a base-piece upon which the machine may be set, and a bent or sprung leaf-spring secured to the casing base-piece and extending longitudinally thereof to serve as a support for the rear feet of the machine, the leaf-spring being secured to the base-piece between the rear feet of the typewriting machine and beyond each side of the main frame of the typewriting machine.

20. A sound-deadening casing for a typewriting machine comprising a base-piece upon which the machine may be set, and a bent or sprung leaf-spring secured to the casing base-piece and extending longitudinally thereof to serve as a support for the rear feet of the machine, the leaf-spring being secured to the base-piece between the rear feet of the typewriting machine and beyond each side of the main frame of the typewriting machine, and the casing base-piece being recessed between the points of attachment of the ends of the leaf-spring to provide space for resilient movement of the spring between the same and the base-piece under the feet of the machine.

21. A sound-deadening casing for a typewriting machine comprising a base-piece upon which the machine may be set, a leaf-spring secured to the casing base-piece and extending longitudinally thereof to serve as a support for the rear feet of the machine, and brackets on the spring comprising slotted plates spaced above the upper face of the spring; the slots in the bracket plates being open at their forward ends to permit the feet of the machine to extend therethrough and rest upon the spring, and being constricted toward the rear, so that, upon rearward movement of the machine on the spring, the walls which form the constricted portions of the slots may interlock with shoulders on the feet of the machine to hold the machine down upon the spring.

22. The combination with a portable typewriter, of a sound-deadening hood therefor forming with the typewriter a silent typewriting unit, and a cover for enclosing said typewriter and hood arranged to form with them a carryable unit.

23. In combination, a carrying case comprising a body and a removable cover, a portable typewriter in the case, and a sound-deadening hood within the case enclosing the typewriter, the arrangement being such that the removal of the cover of the carrying case exposes ready for use a silent typewriting unit.

24. In combination, a portable typewriter, a carrying case therefor, and a sound-deadening hood for the typewriter built into the carrying case, the carrying case including a body-part and a removable cover-part, the sound-deadening hood comprising bottom, rear and side walls which are also common to the carrying case, the sound-deadening hood also comprising a front wall through which the typewriter keyboard projects and a cover through which operating parts of the machine project, said front wall and hood cover being distinct from the carrying case and completely enclosed therein.

25. In combination, a portable typewriter, a carrying case therefor, and a sound-deadening hood for the typewriter built into the carrying case, the carrying case including body and cover parts, the body-part consisting of bottom, rear and side walls which are also common to the sound-deadening hood, and the cover-part including front, top and side walls, the cover-part being removable from the body-part and so constructed that it can be used as a nest for the body-part at typing to add to the thickness of the rear and side walls of the body and to provide an additional supporting thickness beneath the bottom of the body to prevent the transmission of noise-producing vibration to the machine stand.

CORNELIUS B. CORCORAN.
ALFRED G. F. KUROWSKI.